May 6, 1930.　　　J. S. THOMPSON　　　1,757,273
FRICTION BRAKE
Filed March 18, 1926　　3 Sheets-Sheet 1
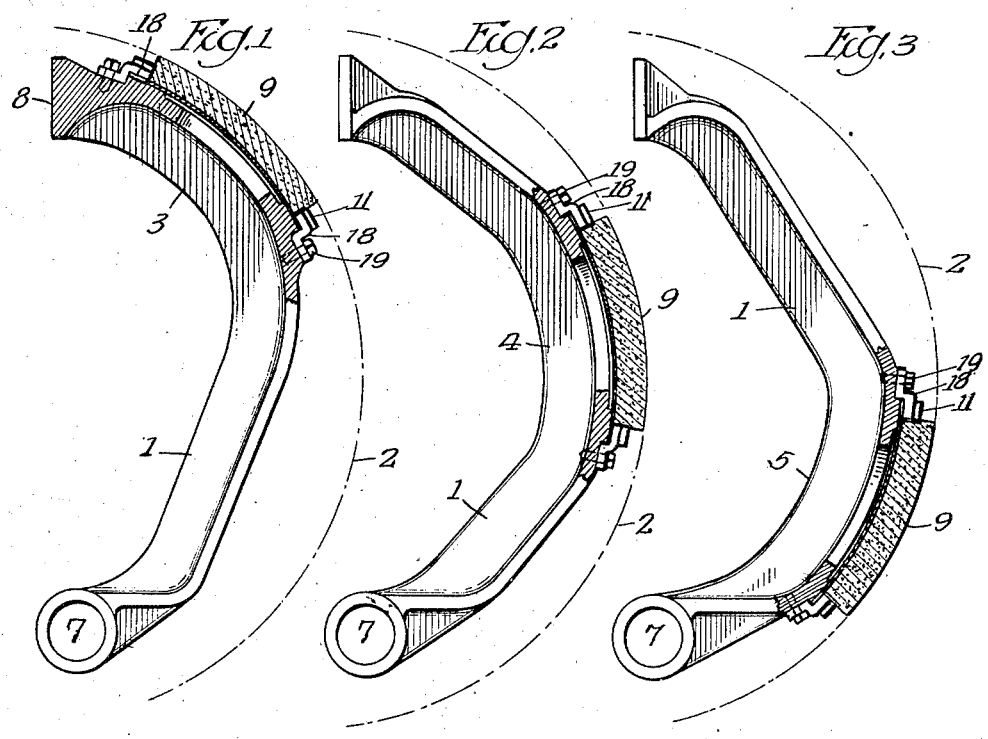
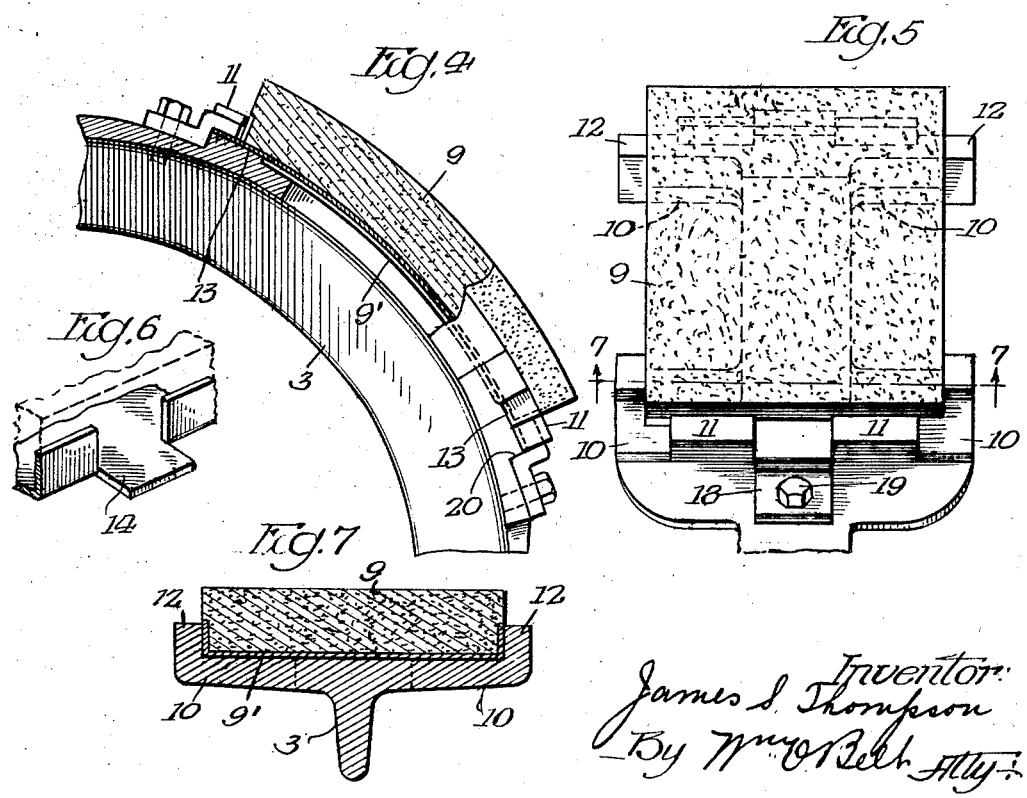

May 6, 1930.  J. S. THOMPSON  1,757,273
FRICTION BRAKE
Filed March 18, 1926   3 Sheets-Sheet 2
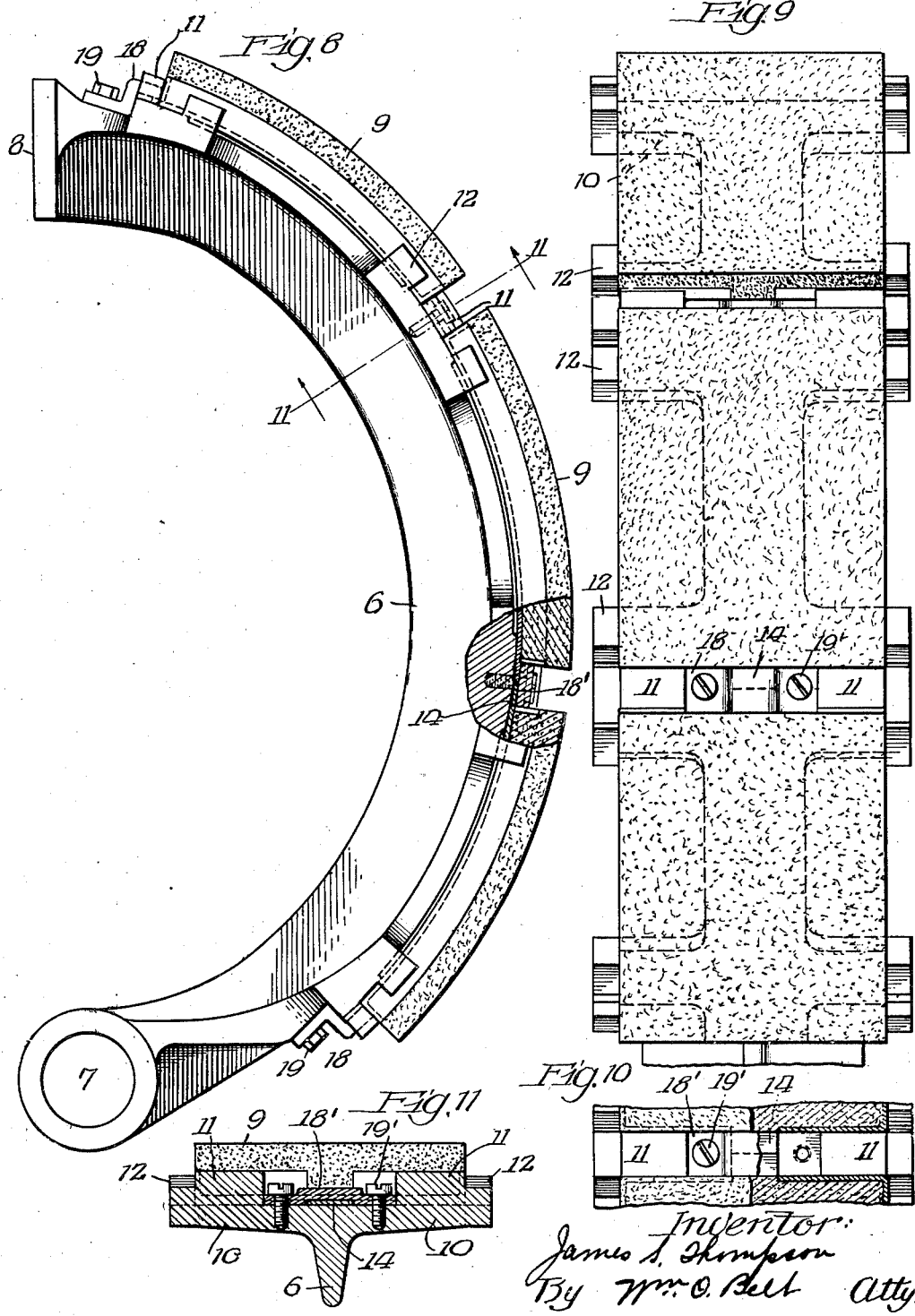

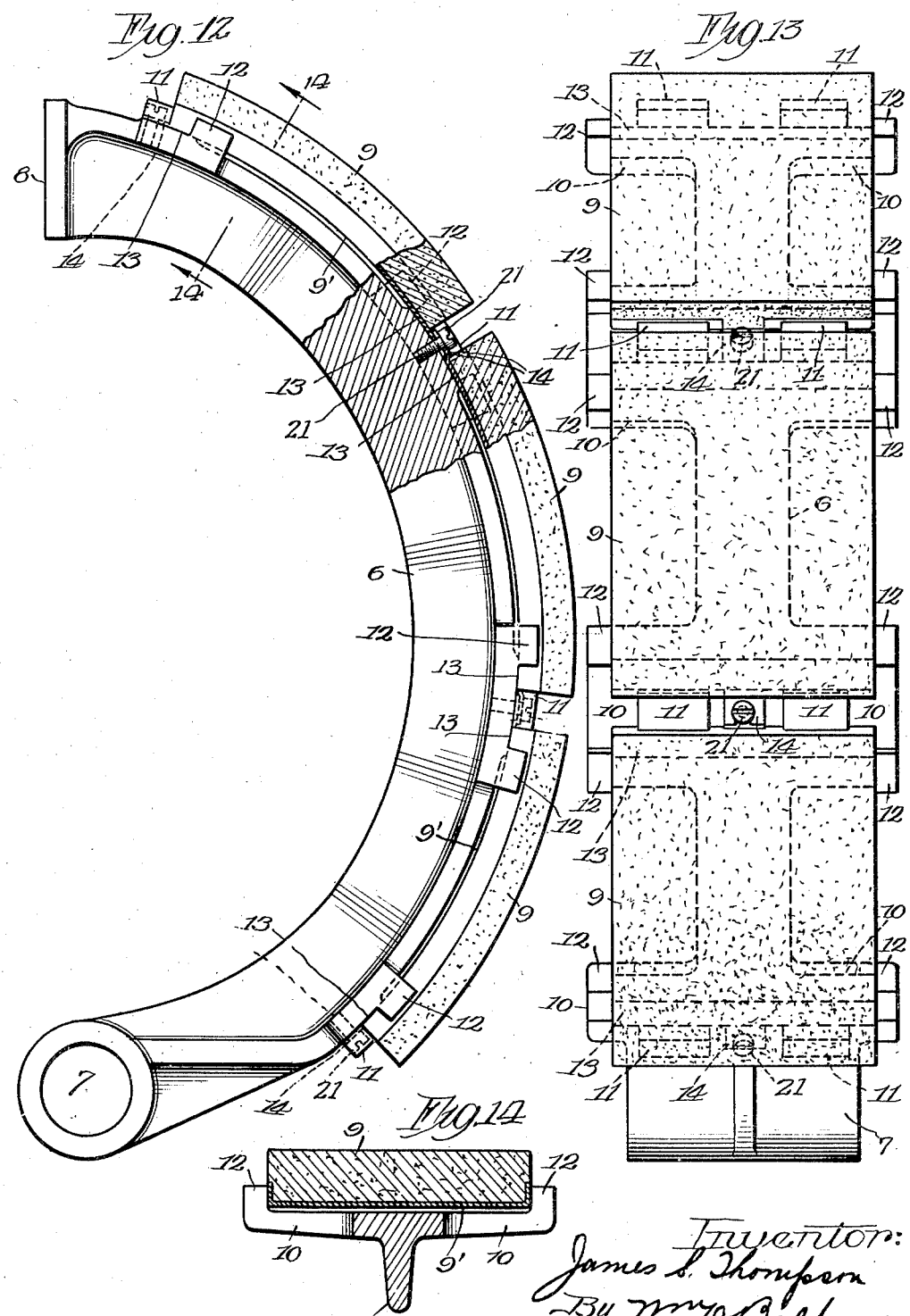

Patented May 6, 1930

1,757,273

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed March 18, 1926. Serial No. 95,602.

This invention relates to friction brakes and while it is particularly adapted for expanding brakes arranged to make frictional contact with a drum, which is a form of brake commonly employed in automotive vehicles, it is also useful in many other installations as will be apparent to those skilled in the art.

The object of the invention is to provide a brake assembly comprising a skeleton head, one or more detachable friction shoes, and means for securing each shoe on the head whereby the shoe may be easily installed and replaced and securely held in position on the head, the construction being such that ample ventilation is provided about the head and the shoe for quickly dissipating the heat of friction.

For the purposes of this application I have illustrated the invention in several embodiments for an expanding brake for automotive vehicles in the accompanying drawings, and referring thereto:

Figs. 1, 2 and 3 are elevations, partly in section, showing different dispositions of a single shoe upon a brake head.

Fig. 4 is an enlarged sectional view showing any one of the shoe dispositions of Figs. 1, 2 and 3.

Fig. 5 is a plan view of Fig. 4.

Fig. 6 is a detail perspective view.

Fig. 7 is a sectional view on the line 7—7 of Fig. 5.

Fig. 8 is an elevation partly in section showing a head provided with three shoes.

Fig. 9 is a plan view of Fig. 8.

Fig. 10 is a detail plan view partly in section.

Fig. 11 is a transverse sectional view on the line 11—11 of Fig. 8.

Fig. 12 is a view similar to Fig. 8 with different fastening means.

Fig. 13 is a plan view of Fig. 12.

Fig. 14 is a sectional view on the line 14—14 of Fig. 12.

In Figs. 1–7 of the drawings the head comprises an arm 1 mounted within a drum indicated by the broken line 2 and in this form of the invention the head is provided with an arcuate seat for a single shoe, whereas in Figs. 8–12 the heads 6 are provided with arcuate seats arranged end to end for a plurality of separate shoes. In Fig. 1 the shoe seat section 3 is located adjacent the free end of the head; in Fig. 2 the shoe seat section 4 is located approximately midway between the ends of the head; and in Fig. 3 the shoe seat section 5 is located adjacent the pivoted end of the head. Each head is provided with an eye 7 to engage a pivot stud of a brake assembly, and its other end 8 is free to be engaged by the means (not shown) which may be employed for swinging the head on its pivot to move the shoe or shoes 9 into and out of operative contact with the drum.

The arm of Figs. 1–5 is T-shaped in cross section as shown in Fig. 7 and the arms of the heads shown in Figs. 8–14 are also T-shaped in cross section, as shown in Figs. 11 and 14. Each of these heads is preferably skeleton in form and its arm is provided with lateral projections 10 suitably spaced apart to provide seats for one or more shoes. Stops 11 are provided on the projections at the ends of the seats to form end stops for the shoe and these end stops may be spaced from the ends of the projections, as shown in Figs. 5 and 13, or they may extend to the outside edges of the projections, as shown in Figs. 9 and 10. Side guides 12 are provided on the ends of the projections to engage the sides of the shoe. The end stops and the side guides are preferably located to snugly engage the ends and the sides of the shoe to position the shoe on the head and prevent endwise or lateral displacement thereof. When the head is made to receive a plurality of shoes, it will be provided with a set of side guides for each shoe and a set of end stops for each shoe, but it will only be necessary to provide one set of end stops between the adjacent ends of two shoes. Shoulders 13 are provided on the heads adjacent the end stops to support the shoe so that the back of the shoe will be free from the head except at its ends where it engages the shoulders.

I provide the shoe with end projections to be engaged by devices for fastening the shoe on the head. I have found it desirable to use a composition shoe and to provide it with a metal back 9', which may be made in the form of a shell, as shown. The shell may be cut at its ends to form projections 14, and these projections may be provided with openings in the form of a hole 15, Fig. 15, or an end slot 16, Fig. 16, or a side slot 17, Fig. 17.

Various means may be employed for fastening the shoe to the head. In Figs. 1-5 I have shown the shoe fastened to the head by means of clamps 18 which overlap the projections 14 on the shoe and are secured in place by bolts 19. In Figs. 8-10 the outer ends of the outer shoes are secured by clamps 18, but the opposing ends of adjacent shoes have their projections 14 abutting and a double clamp 18' is arranged between the ends of the shoes and overlaps the projections on both shoes. Separate clamps 18 may be arranged between the shoes, if desired, but I prefer to use the double clamp 18' because it reduces the number of parts and occupies less space. The clamps may be flat, but I prefer to make the clamps 18 angular, as shown, to engage shoulders 20 on the head and I also prefer to make the double clamps 18' angular, as shown in Fig. 11 so that they will set snugly on the head and the projections 14. I may dispense with the clamp and engage the bolt 21 directly with the projections, as shown in Figs. 12-13. The bolt may be arranged to have its head engage the edge of the projection. The projections at the opposing ends of adjacent shoes may be overlapped, as shown in Fig. 12 so that a single bolt will engage two projections.

The shoe is seated on the head between end stops and side guides and since it is desirable that the shoe should fit the seat comparatively snug there will be very little if any tendency on the part of the shoe to move endwise or sidewise on the seat. The fastening means are employed solely to prevent any tendency of the shoe to move outward from its seat. Under all conditions there will be very little if any tendency of the shoe to move outward from its seat and the means herein disclosed for fastening the shoe to its seat will be amply sufficient for the purpose.

I am aware that changes in the form, construction and arrangement of parts may be made without departing from the spirit or sacrificing the advantages of the invention herein set forth and I reserve the right to make all such changes as fairly fall within the scope of the following claims.

I claim:

1. The combination of a brake head, a friction shoe seated on the head and having a metal shell thereon, projections at the ends of the shell, and detachable means engaging said projections and the head for securing the shoe to the head.

2. The combination of a brake head, a friction shoe seated on the head and having projections at its ends, and detachable means engaging said projections and the head for securing the shoe to the head.

3. The combination of a brake head, a composition friction shoe having a metal shell thereon, projections at the back and ends of said shell, and detachable means engaging said projections and the head for securing the shoe to the head.

4. The combination of a brake head, a composition friction shoe having a metal back thereon, projections at the ends of said back, and detachable means engaging said projections and the head for securing the shoe to the head.

5. The combination of a brake head, a composition friction shoe seated on the head and having a metal back thereon, integral projections at the ends of said back extending beyond the ends of the body of the shoe, and detachable means engaging said projections and the head for securing the shoe to the head.

6. The combination of a brake head, a friction shoe seated on the head and having a back thereon with projections at its ends, and clamps secured to the head and engaging said projections for securing the shoe to the head.

7. The combination of a brake head, a friction shoe seated on the head and having a back thereon with projections at its ends, angular clamps engaging said projections, and means for securing the clamps to the head.

8. The combination of a brake head, a pair of friction shoes seated on the head, a shell on each shoe, projections on the adjacent ends of said shells, and clamps fastened to the head over said projections for securing the shoes to the head.

9. The combination of a brake head, a pair of friction shoes seated on the head and having projections on their opposing ends arranged in abutting relation, clamps overlapping said projections, and means securing said clamps to the head.

JAMES S. THOMPSON.